United States Patent [19]
Lordo

[11] Patent Number: 5,798,596
[45] Date of Patent: Aug. 25, 1998

[54] PERMANENT MAGNET MOTOR WITH ENHANCED INDUCTANCE

[75] Inventor: Robert E. Lordo, Tega Cay, S.C.

[73] Assignee: Pacific Scientific Company, Rock Hill, S.C.

[21] Appl. No.: 718,046

[22] Filed: Jul. 3, 1996

[51] Int. Cl.$^6$ .............. H02K 1/22; H02K 21/12; H02K 1/06
[52] U.S. Cl. .............. 310/261; 310/156; 310/216
[58] Field of Search .............. 310/216, 217, 310/218, 261, 162, 166, 168, 156

[56] References Cited

U.S. PATENT DOCUMENTS

| | | | |
|---|---|---|---|
| 3,492,520 | 1/1970 | Yates | 310/156 |
| 4,139,790 | 2/1979 | Steen | 310/156 |
| 4,358,697 | 11/1982 | Liu et al. | 310/156 |
| 4,839,547 | 6/1989 | Lordo et al. | 310/60 A |
| 4,916,346 | 4/1990 | Kliman | 310/216 |
| 5,159,220 | 10/1992 | Kliman | 310/156 |
| 5,296,773 | 3/1994 | El-Antably et al. | 310/261 |
| 5,378,953 | 1/1995 | Uchida et al. | 310/156 |
| 5,463,262 | 10/1995 | Uchida | 310/156 |

OTHER PUBLICATIONS

Tomy Sebastian and Gordon R. Slemon, *Operating Limits of Inverter–Driven Permanent Magnet Motor Drives*, Entire Article is Relevant, Mar./Apr. 1987 and Place of Publication Unknown to Applicant.

Author Unknown to Applicant, *Vector Control of Synchronous Machines*, Entire Article is Relevant; however, Particularly p. 82 Section 3.1.2., Date and Place of Publication Unknown to Applicant.

Shigeo Morimoto, Yoji Takeda and Takao Hirasa, *Expansion of Operating Limits for Permanent Magnet Motor by Current Vector Control Considering Inverter Capacity*, P. 869 is Relevant, Place of Publication Unknown to Applicant, Sep./Oct. 1990.

*Primary Examiner*—Steven L. Stephan
*Assistant Examiner*—Michael J. Wallace, Jr.
*Attorney, Agent, or Firm*—Adams Law Firm, P.A.

[57] ABSTRACT

A permanent magnet motor with enhanced inductance which comprises a motor frame having annular inner walls defining a void therein and a stator mounted on and extending around the periphery of the inner walls of the frame in the void in the motor frame. The stator includes windings positioned thereon for developing current from power supplied to the motor, the innermost portion of the stator defining a radial inner portion of the void. A rotor is mounted in the void radially inwardly of the stator for concentric rotation in the motor frame in closely spaced-apart relation to the stator. The rotor has an iron core for air gap flux interaction with the stator, and the rotor has a magnet zone and a lamination zone extending axially along the length of the rotor. The magnet zone has a permanent magnet positioned on the rotor and projecting therefrom for interaction with the windings on the stator to produce magnetic-field induced torque for rotating the rotor. The lamination zone has a plurality of stacked laminations positioned on the rotor for rotation therewith, the lamination zone being adjacent to the magnet zone and devoid of magnets. The laminations extend from the rotor shaft into closely spaced-apart radial alignment with a portion of the windings and forming an area of decreased air gap and increased inductance between the stator and the rotor.

14 Claims, 9 Drawing Sheets

PERMANENT MAGNET MOTOR WITH ENHANCED INDUCTANCE

TECHNICAL FIELD AND BACKGROUND OF THE INVENTION

This invention relates to a permanent magnet motor having a novel rotor design which enhances motor inductance. In the embodiment disclosed herein, the permanent magnet motor is a brushless DC permanent magnet motor having rare earth or ferrite permanent magnets surface-mounted to and projecting outwardly from an iron rotor core.

Brushless DC motors offer substantial advantages over AC induction motors and brush-type DC motors. Traditional AC induction motors must "slip", i.e., fall behind their natural synchronous speed in order to develop torque. An AC induction motor running at or near synchronous speed does not develop torque and is therefore useless. The amount of slip varies with the amount of torque required from the motor. Since slip is a percentage of the operating speed, and the amount of slip varies with the load, it is difficult to predict the speed at which an AC induction motor will run under any given set of operating conditions. It is therefore very difficult to maintain an exact speed when operating the motor under varying load conditions.

Brush-type DC motors are operated using solid-state AC to DC power converters which have inherent limitations on their ability to provide power as needed. In addition, brush-type DC motors are self-commutating devices which use the power applied to the motor inefficiently, and have contacting parts which wear. The speed of such a DC motor is determined by the voltage applied at the brushes where they come in contact with the commutator. At this location voltage drops, referred to as IR losses, frequently occur. In addition, the voltage is applied away from the output terminals of the motor controller where the motor's armature voltage is often used to regulate speed. The voltage differences between the brushes and the motor control output vary with load, as does speed. Speed control for brush-type DC motors is expensive and even then only controls the average speed.

In contrast, brushless DC motors overcome these problems by, for example, regulating speed by measuring physical shaft position within a single revolution. With a brush-type DC motor speed regulation of +/−0.5% is possible with a very expensive solid state tachometer. Brushless DC motors set for a given speed, such as 1750 rpm, run at exactly that speed—no more and no less.

Brushless DC motors also offer other advantages, such as a compact frame size for a given power output.

There are operating conditions where high inductance is desirable for maximum performance in a motor. For example, applications where phase advance is necessary rely on high inductance for proper and optimum motor operation. Such applications include, for example, textile winding machines and precision machine tool spindles.

Figure 6:
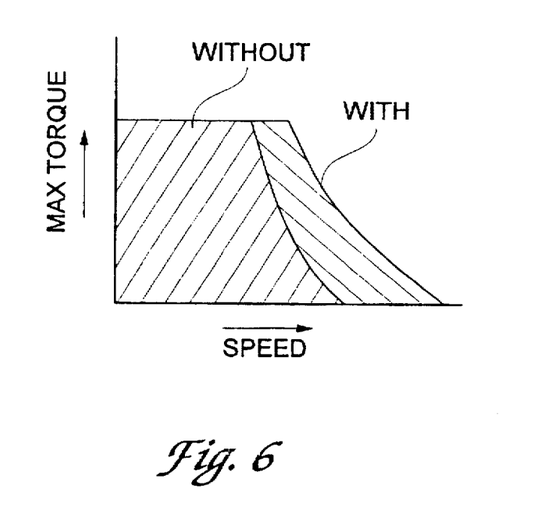
FIG. 6 is a plot showing speed at constant torque for brushless DC motor with and without phase advance.

Phase advance can substantially increase the speed range over which constant torque can be achieved, as is shown in FIG. 6.

However, brushless DC motors have inherently low inductance. This is caused by the typical use of permanent magnets which are applied to the surface of the rotor core and project outwardly into the air gap between the rotor and the stator. Inductance varies as a function of the distance between the windings of the stator and the iron of the rotor core.

Permanent magnets such as neodymium-iron-boron ("Nd-Fe-B") have a relative permeability of very nearly unity. For this reason the magnets are "invisible" to the stator and appear to the stator magnetomotive force as an equivalent air gap. Thus, the air gap in a brushless DC motor may be many times the equivalent air gap in, for example, an AC induction motor.

Proposals have been made for permanent magnet motors wherein the magnets are set spaced apart into the rotor core with the top of the magnets substantially flush with the top of the rotor core between the magnets. In this way, the air gap is kept very narrow and inductance is increased somewhat. This approach is explained in T. Sebastian and G. Slemon, *Operating Limits of Inverter-Driven Permanent Magnet Motor Drives*, IEEE Transactions on Industry Applications, Vol. 1A-23, No. 2, March/April 1987 at 327–333 ("Sebastian"). In Sebastian, torque-speed characteristics of permanent magnet motors with projecting magnets are summarized, and then compared with an equivalent motor having magnets inset into the rotor and flush with the interspersed rotor core sections. Sebastian at 330, FIG. 9. There is improvement in the size and shape of the torque/speed envelope by use of inset magnets. Id. at 332, FIG. 15.

There are also drawbacks to this technique for increasing inductance in permanent magnet motors. Expensive tooling and machinery is necessary to form the recesses in the rotor core. Specially-designed magnets which are a size and shape suitable for being inset into the rotor core are also necessary. As set out in Sebastion, at 331, magnet width of 120 degrees—67% of the 180 degree pole arc of the motor is considered optimum, with little advantage seen in a magnet having a width greater than 120 degrees.

However, there is a substantial penalty paid in motor power by limiting use of magnets to those having a width of 120 degrees or less. Applicant uses permanent magnets having a width of 150–160 degrees for its motors. These magnets are affixed to and project outwardly from the rotor core—a design in comparison with which inset magnets are alleged to be an improvement. Applicant's motors have a more advantageous size to power ratio than motors with inset magnets.

It is also well known that different types motors have differing "behavior" characteristics, including many that are either difficult to quantify, or which are not completely understood. This is true of surface mounted, projecting permanent magnet brushless DC motors. These motors have been found to be optimal for many applications because of the precise speed control, torque and other features which are unique this particular type of motor. These features would not necessarily be the same, or perceived to be the same, in other motor configurations, such motors with inset magnets. These differences are suggested in the Sebastian article, supra.

The motor design set out in this application results in a superior permanent magnet motor with enhanced inductance, while retaining all of the advantages of surface-mounted permanent magnet-type of this motor.

SUMMARY OF THE INVENTION

Therefore, it is an object of the invention to provide a permanent magnet motor with enhanced inductance.

It is another object of the invention to provide a permanent magnet motor which is particularly suitable for applications where optimal phase advance is necessary or desirable.

It is another object of the invention to provide a permanent magnet motor which achieves enhanced inductance without the use of inset permanent magnets.

It is another object of the invention to provide a permanent magnet motor which achieves enhanced inductance without the need for expensive tooling or specially-designed magnets.

It is another object of the invention to provide a permanent magnet motor which achieves enhanced inductance while maintaining other operating characteristics of permanent magnet motors with surface-mounted permanent magnets.

It is another object of the invention to provide a permanent magnet motor which has enhanced inductance while maintaining a relatively wide magnet width in the range of 80% or greater of the pole arc of the motor.

These and other objects of the present invention are achieved in the preferred embodiments disclosed below by providing a permanent magnet motor with enhanced inductance which comprises a motor frame having annular inner walls defining a void therein and a stator mounted on and extending around the periphery of the inner walls of the frame in the void in the motor frame. The stator includes windings positioned thereon for developing current from power supplied to the motor, the innermost portion of the stator defining a radial inner portion of the void. A rotor is mounted in the void radially inwardly of the stator for concentric rotation in the motor frame in closely spaced-apart relation to the stator. The rotor has a laminated iron core for air gap flux interaction with the stator, and the rotor has a magnet zone and a lamination zone extending axially along the length of the rotor.

The magnet zone has permanent magnets positioned on the rotor and projecting therefrom for interaction with the windings on the stator to produce magnetic-field induced torque for rotating the rotor. The lamination zone has a plurality of stacked laminations positioned on the rotor for rotation therewith, the lamination zone being adjacent to the magnet zone and devoid of magnets. The laminations extend from the rotor shaft into closely spaced-apart radial alignment with a portion of the windings and forming an area of decreased air gap and increased inductance between the stator and the rotor.

According to one preferred embodiment of the invention, the lamination zone is positioned on one end of the rotor, and the magnet zone is adjacent to one side only of the lamination zone.

According to another preferred embodiment of the invention, the lamination zone occupies at least 5 percent of the combined length of the magnet zone and the lamination zone.

According to yet another preferred embodiment of the invention, each lamination has a thickness no greater than one percent of its diameter.

According to yet another preferred embodiment of the invention, the magnets have an arc width of no less than 140 degrees.

According to yet another preferred embodiment of the invention, the magnets have an arc width of between 150 and 160 degrees.

According to yet another preferred embodiment of the invention, a permanent magnet motor with enhanced inductance is provided and comprises a motor frame having annular inner walls defining a void therein and a stator mounted on and extending around the periphery of the inner walls of the frame in the void in the motor frame. The stator includes windings positioned thereon along an axial length "x" for developing current from power supplied to the motor, the innermost portion of the stator defining a radial inner portion of the void. A rotor is mounted in the void radially inwardly of the stator for concentric rotation in the motor frame in closely spaced-apart relation to the stator. The rotor has an iron core for air gap flux interaction with the stator. The rotor also has a magnet zone and a lamination zone extending axially along the length of the rotor. The magnet zone has a length "y" having therein permanent magnets positioned on the rotor and projecting therefrom for interaction with the windings on the stator to produce magnetic-field induced torque for rotating the rotor. The lamination zone has a length "z" having therein a plurality of stacked laminations positioned on the rotor for rotation therewith. The lamination zone is adjacent to the magnet zone and devoid of magnets. The laminations extend from the rotor shaft into closely spaced-apart radial alignment with a portion of the windings and form an area of decreased air gap and increased inductance between the stator and the rotor. The lengths "y" and "z" are substantially equal the length "x".

According to one preferred embodiment of the invention, the permanent magnets comprise ceramic ferrite magnets.

According to another preferred embodiment of the invention, the magnets comprise neodymium-iron-boron magnets.

According to yet another preferred embodiment of the invention, the motor is a brushless DC motor.

According to yet another preferred embodiment of the invention, the permanent magnet motor includes power means comprising a three-phase AC power, input rectifier means for converting the AC power input into DC power, DC power storage means for storing the rectified AC power as DC, and electronic power output means for inverting the DC power back into precisely controlled AC power to the windings of the stator according to a predetermined torque-maximizing schedule.

According to yet another preferred embodiment of the invention, the electronic power output means includes transistor means operatively connected to the capacitors for current flow from the capacitors through the transistors to the windings of the stator, and memory means for storing the predetermined torque-maximizing schedule and for controlling the switching of the transistors according to the predetermined torque-maximizing schedule.

According to yet another preferred embodiment of the invention, a permanent magnet motor with enhanced inductance is provided, comprising a motor frame having annular inner walls defining a void therein, a stator mounted on and extending around the periphery of the inner walls of the frame in the void in the motor frame, the stator including windings positioned thereon for developing current from power supplied to the motor. The innermost portion of the stator defines a radial inner portion of the void. A rotor is mounted in the void radially inwardly of the stator for concentric rotation in the motor frame in closely spaced-apart relation to the stator and has an iron core for air gap flux interaction with the stator. The rotor has a magnet zone and a lamination zone extending axially along the length of the rotor. The magnet zone has permanent magnets positioned on the rotor and projecting therefrom for interaction with the windings on the stator to produce magnetic-field induced torque for rotating the rotor. The magnets have an arc width of no less than 140 degrees. The lamination zone has a plurality of stacked laminations positioned on the rotor for rotation therewith, the lamination zone being adjacent to the magnet zone and devoid of magnets. The laminations extend from the rotor shaft into closely spaced-apart radial alignment with at portion of the windings and form an area of decreased air gap and increased inductance between the stator and the rotor. The lamination zone is positioned on one end of the rotor, and the magnet zone is adjacent to one side only of the lamination zone. The lamination zone occupies at least 5 percent and no more than 15 percent of the combined length of the magnet zone and the lamination zone. The lamination has a thickness no greater than one percent of its diameter and usually has the same thickness as the stator laminations.

According to yet another preferred embodiment of the invention, a permanent magnet motor with enhanced inductance is provided comprising a motor frame, a stator having stator windings thereon mounted in the frame, and a rotor mounted in a void in the stator for concentric rotation in the motor frame in closely spaced-apart relation to the stator and having an iron core for air gap flux interaction with the stator. The rotor has a first zone having a first stack of laminations extending therealong on which permanent magnets are surface-mounted and a second zone having a second stack of laminations extending therealong and devoid of magnets. The second stack of laminations has a radius greater than the first stack of laminations, and extends radially outwardly into closely spaced apart relation with the stator windings and forming an area of decreased air gap and increased inductance between the stator and the rotor.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
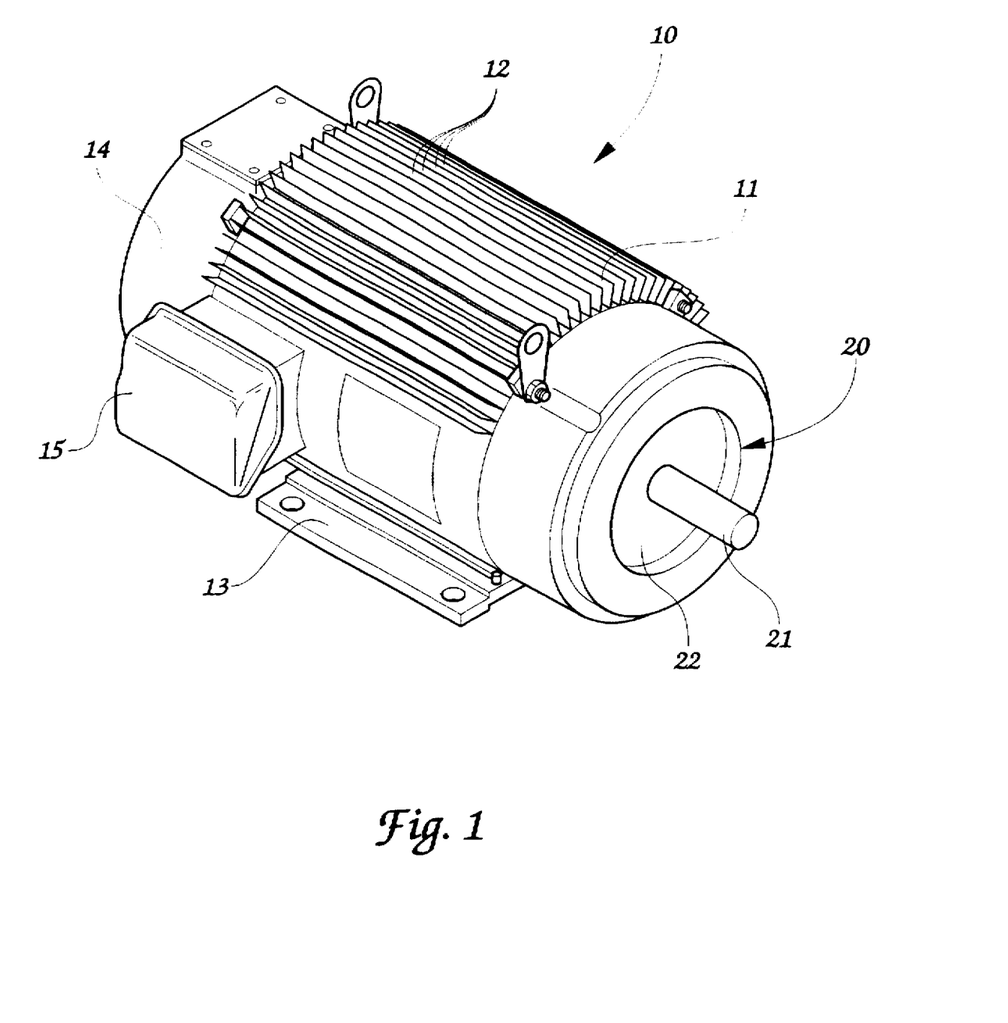
FIG. 1 is a perspective view of a permanent magnet motor according to a preferred embodiment of the invention.

Referring now specifically to the drawings, a permanent magnet motor according to the present invention is illustrated in FIG. 1 and shown generally at reference numeral 10. The permanent magnet motor 10 disclosed in this application is a brushless DC permanent magnet motor with any suitable type of permanent magnet, which may include ferrous magnets or neodymium-iron-boron ("Nd-Fe-B") magnets. Permanent magnet motor 10 includes a motor housing or frame 11 having cooling fins 12, a motor mount 13, and control housings 14 and 15. A rotor 20 is mounted in the frame 11 and includes an output shaft 21 and a rotor core 22 which interconnects the motor 10 to any suitable device to which rotational motion is to be supplied. These components may be in accordance with U.S. Pat. No. 4,839,547 to applicant's predecessor.

Figure 2:
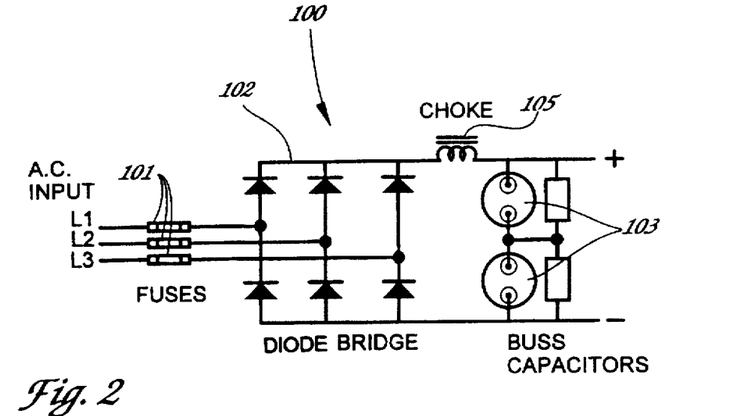
FIG. 2 is a simplified drawing of the input power section of a brushless DC motor control.

Referring now to FIGS. 2, 3, 4 and 5, general operation of the permanent magnet motor 10 is summarized. As is shown in FIG. 2, Three phase AC power is converted to DC by the input side of a brushless DC motor control 100. AC power passes through fuses 101 to a diode bridge 102 which feeds capacitors 103 which form a DC bus. The diode bridge 102 rectifies the AC power and supplies DC power for storage in the capacitors 103. The link indicator and the capacitors fitting the DC power. The fuses 101 protect the diode bridge 102 from excessive input current. An input choke 105 in the DC leg of the diode bridge 102 protects the capacitors against transients, limits the rate at which input current may increase or decrease and filters the AC components in the DC bus.

The capacitors 103 draw current from the power lines when the voltage of the capacitors 103 is lower than the instantaneous line-to-line voltage. The arrangement permits a brushless DC motor to run at very low speeds and very high torques while drawing very little current from the AC line. The RMS current at the input of the permanent magnet motor 10 is directly proportional to the output power of the motor, rather than proportional to the motor load torque.

Figure 3:
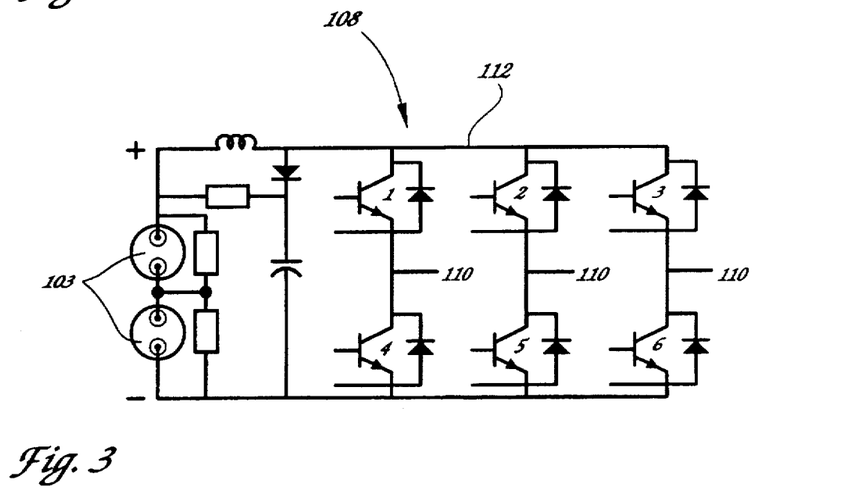
FIG. 3 is a circuit diagram of a power output bridge of a brushless DC motor control.

The stator of the permanent magnet motor 10 is wound similarly to an AC induction motor, but uses permanent magnets on the rotor 20 instead of shorted rotor bars. As is shown in FIG. 3, on the power output bridge 108 there are three power-carrying wires 110 going to the motor 10. Each of these wires 110 is connected to either side of the DC bus capacitors 103. This is accomplished with a six-transistor bridge 112.

Applying power to the motor requires turning on one transistor connected to the positive side of the DC bus and one transistor connected to the negative side of the bus, but never the two transistors in the same leg of the output. When two transistors are turned on, the entire bus voltage is applied to the windings of the motor through the two wires connected to those transistors and current will flow if the CEMF of the motor is not greater than the bus until the transistors are turned off. Due to the induction of the motor windings, the current will not cease immediately when the transistors are turned off.

Figure 4:
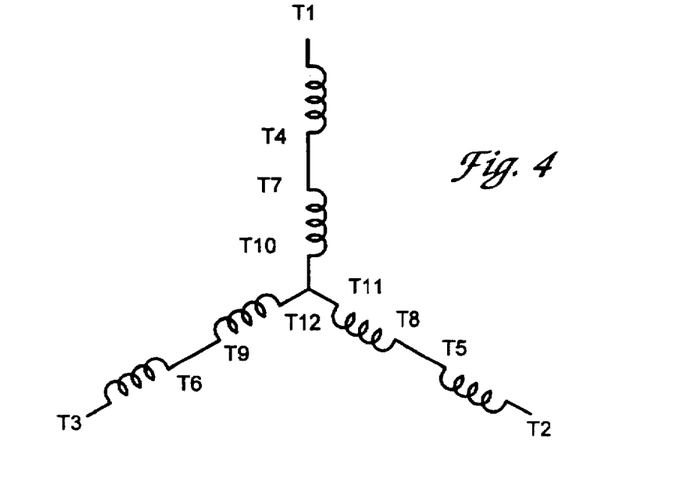
FIG. 4 is a schematic representation of the windings of a brushless DC motor.

In FIG. 4, one of several possible connection arrangements is illustrated. Different wiring arrangements change the speed and horsepower of the motor, while the torque remains the same.

Figure 5:
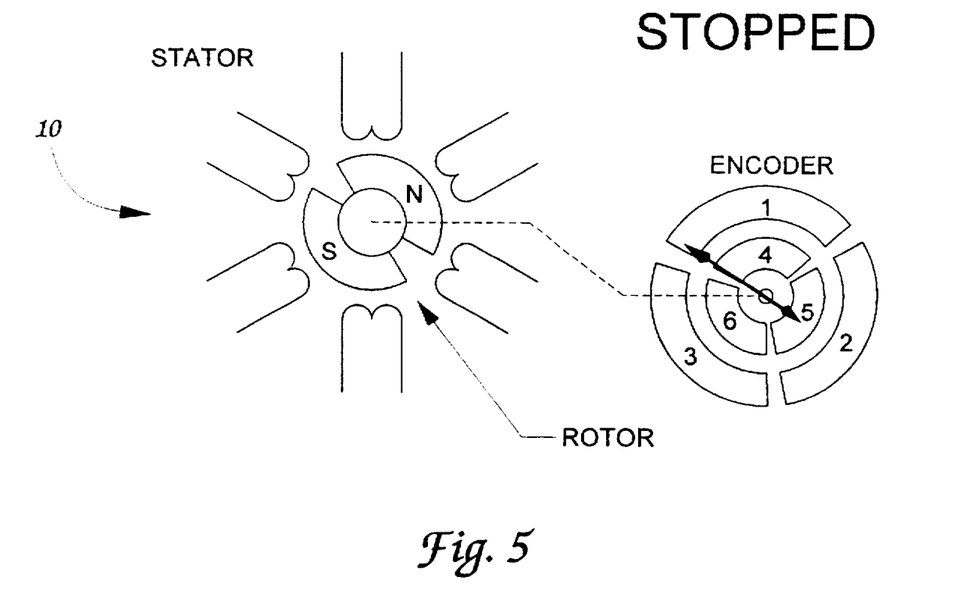
FIG. 5 is a simplified drawing of the major parts of a brushless DC motor.

FIG. 5 illustrates the major parts of one embodiment of the permanent magnet motor 10 in the off state. The stator windings are connected as shown, and the motor 10 is operated from the power bridge shown in FIG. 3. Current is developed in the windings, producing torque by the interaction of magnetic fields produced by the stator windings from the power supplied by the input power section of the motor control, FIGS. 2 and 3, and the fields of the permanent magnets mounted on the rotor.

As is also shown in FIG. 5, motor 10 has an electronic commutator fed by an integral encoder mounted on the motor 10. The encoder tells the motor control which transistor of the transistor bridge 112 should be turned on to obtain the maximum torque from the motor 10 at whatever position the motor shaft happens to be at that time. This establishes a communication between the motor and its control which is not present in AC motors and inverters, and which is not a part of the DC brush-type motor and its SCR controller. Motor 10 always knows where the motor shaft 21 is in its rotation because the encoder is constantly monitoring it.

Preferably, a resolver (not shown) is used to monitor the position of the motor shaft 21. A suitable resolver is a transmitter type such as frameless resolvers used in other servo motors made by applicant.

Referring now to FIG. 6 a plot showing speed at constant torque for a brushless DC motor with and without phase advance illustrates the advantage obtained by increasing the inductance of a permanent magnet motor. As is shown, the constant torque range of a permanent magnet motor is increased by advancing the phase of the motor current.

An increase in the range of constant power output by current phase advance can be achieved by increasing the inductance of the motor. Inductance can be increased by decreasing the air gap between the rotor core and the stator. In the present invention this is done by shortening the stack of permanent magnets and replacing the magnets with a zone of laminations of enlarged diameter which rotate in very closely-spaced apart relation to the stator.

Figure 7:
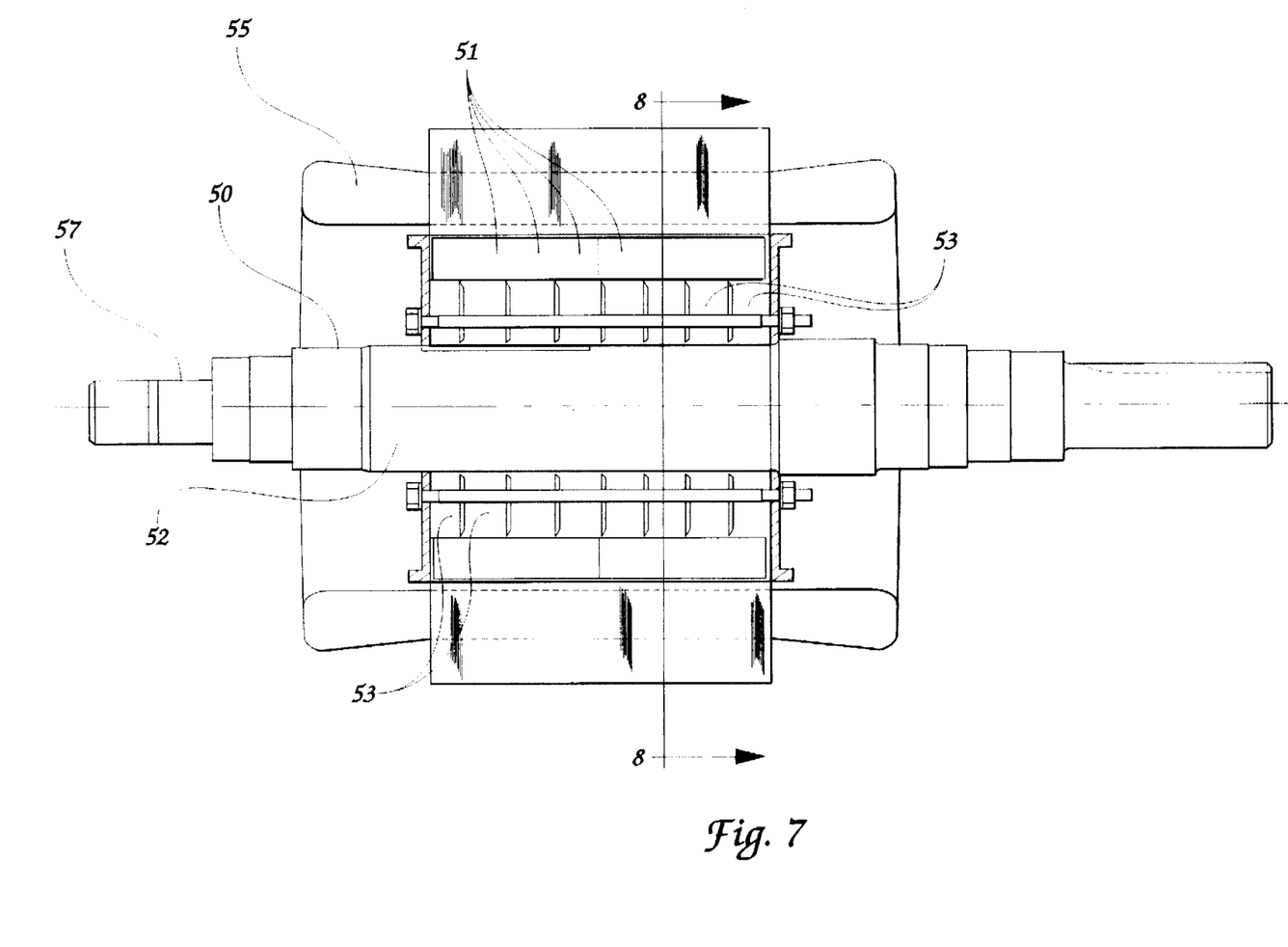
FIG. 7 is a side vertical cross section of a rotor and stator of a standard brushless DC motor.
Figure 8:
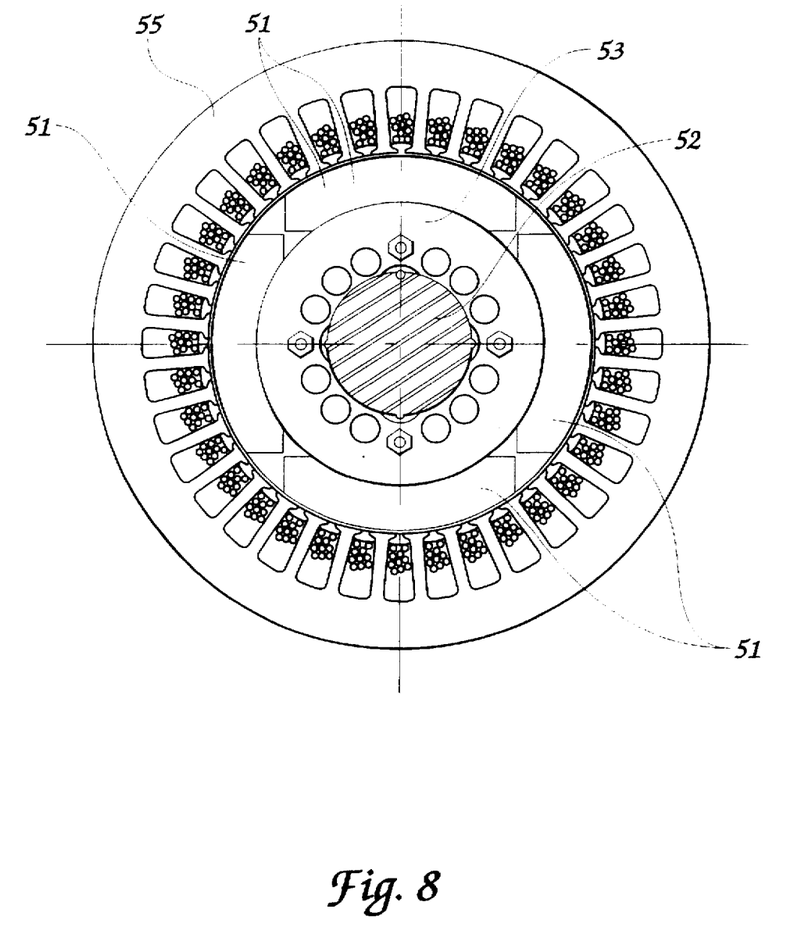
FIG. 8 is an end vertical cross section taken along line 8—8 of FIG. 7.

As is shown in FIGS. 7 and 8, a standard permanent magnet motor includes a rotor 50 with surface mounted permanent magnets 51 extending a predetermined distance along the length of the rotor core 52. The magnets 51 are adhered to the outer surfaces of laminations 53. The rotor 50 rotates within a stator 55, which includes windings 56 to turn output shaft 57. As can be seen, the length of the permanent magnets 51 and the stator 55 is coextensive, meaning that there is a large air gap the entire length of the power-generating portion of the rotor 50. As explained above, this results in relatively low inductance and a consequent reduction in the ability to phase-advance the motor to optimum levels.

Figure 9:
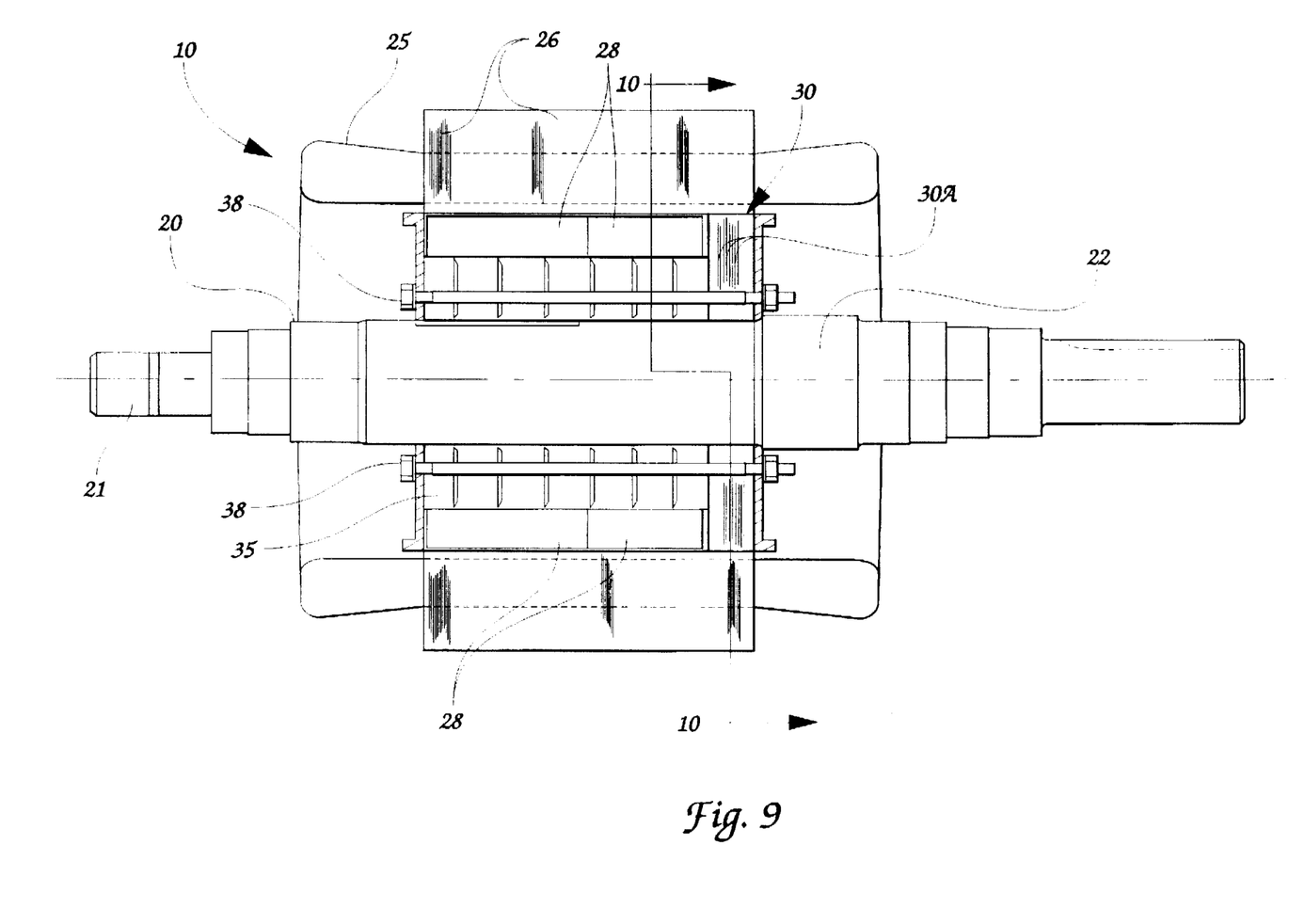
FIG. 9 is a side vertical cross section of the rotor and stator of a brushless DC motor having enhanced inductance in accordance with an embodiment of the present invention.
Figure 10:
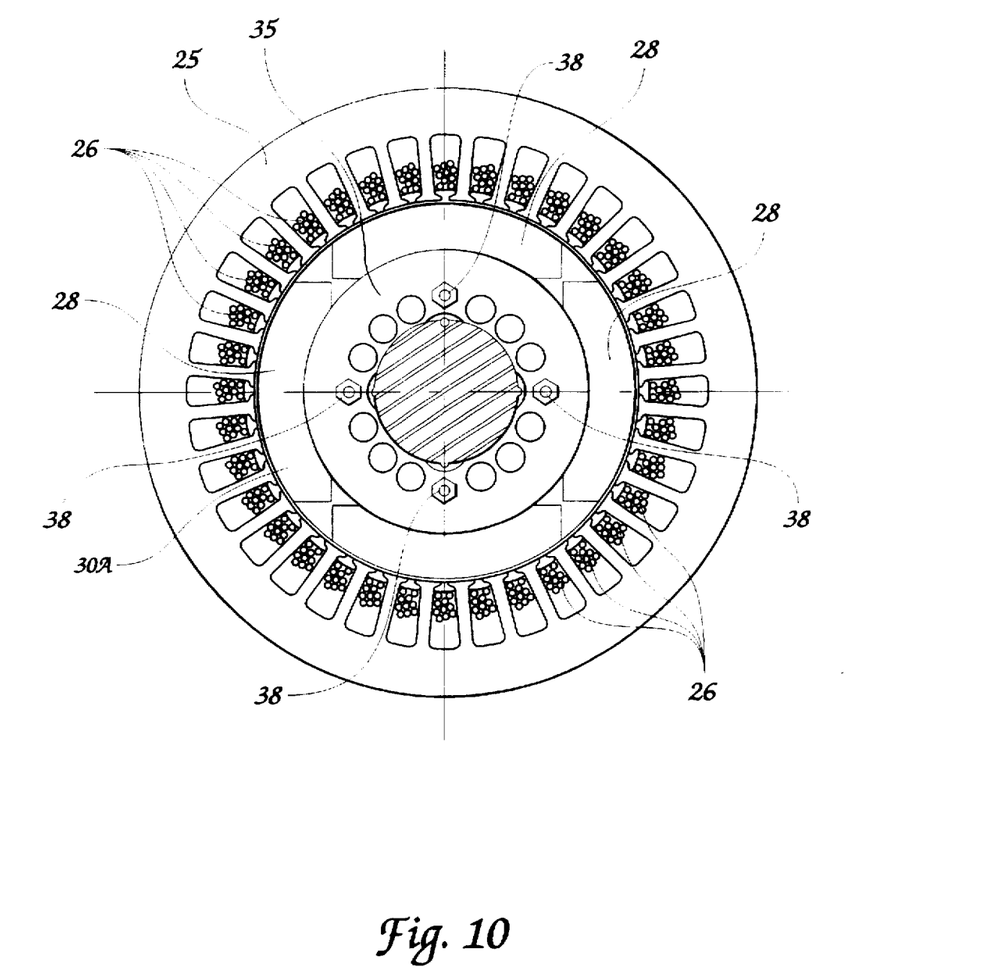
FIG. 10 is an end vertical cross section taken along line 10—10 of FIG. 9.
Figure 12:
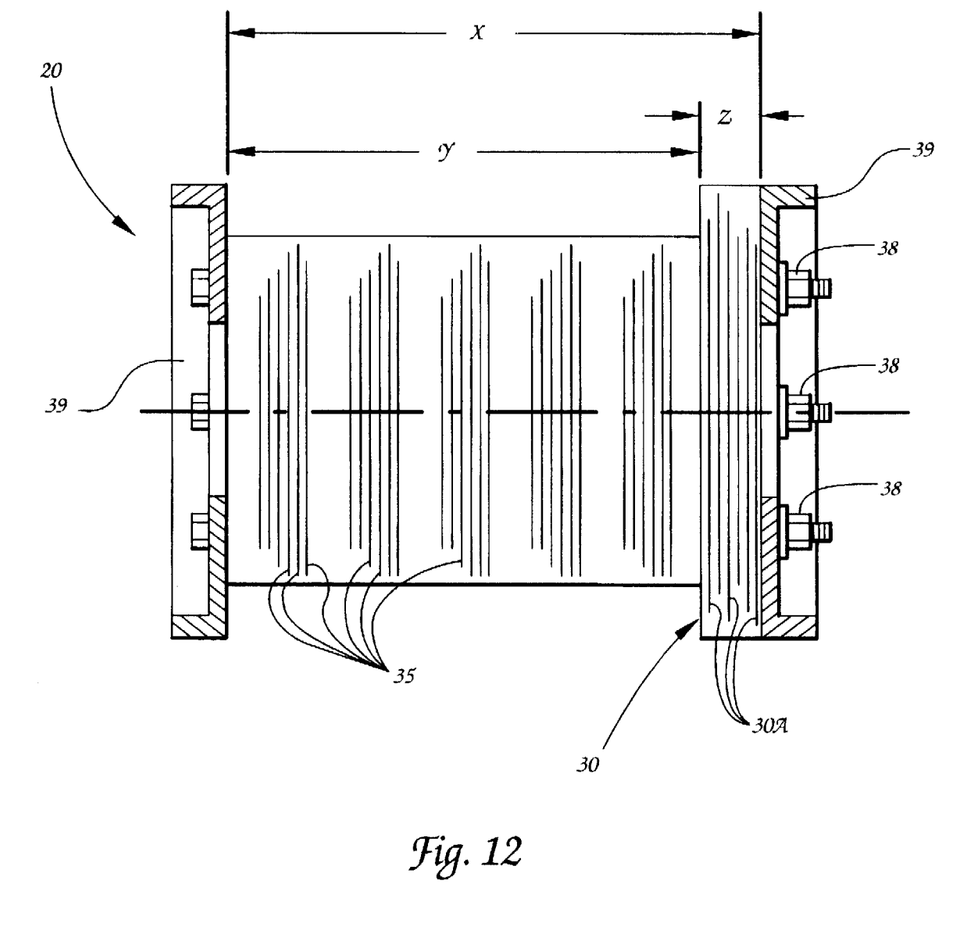
FIG. 12 is a side elevation of the rotor according to an embodiment of the present invention.

Referring now to FIGS. 9 and 10, the novel design of the permanent magnet motor 10 permits a method for altering the generated voltage to inductance ratio and achieves increased inductance without altering the desirable characteristics of surface-mounted permanent magnet motors. Stator 25 with windings 26 is unchanged from stator 55 in a conventional permanent magnet motor, as illustrated in FIGS. 7 and 8. Rotor 20 includes magnets 28 and underlying laminations 35 which extend along the rotor core 22 for only a portion of the distance of the rotor 20 coextensive with the stator 25. On one end of the rotor core 22 is a lamination stack 30 formed of a multitude of thin lamination components 30A mounted concentrically with the smaller diameter laminations 35 on the rotor core 22. The entire assembly is held together as a unit by the mounting bolts 38, as shown in FIGS. 9, 10 and 12 and the end washers/balance rings 39. The lamination stack 30 extends radially outwardly from the rotor core 22 to within a very closely spaced-apart distance of the stator, thereby increasing the inductance through the very small air gap along this distance and thus increasing the inductance of the motor 10 by a proportional amount.

Figure 11:
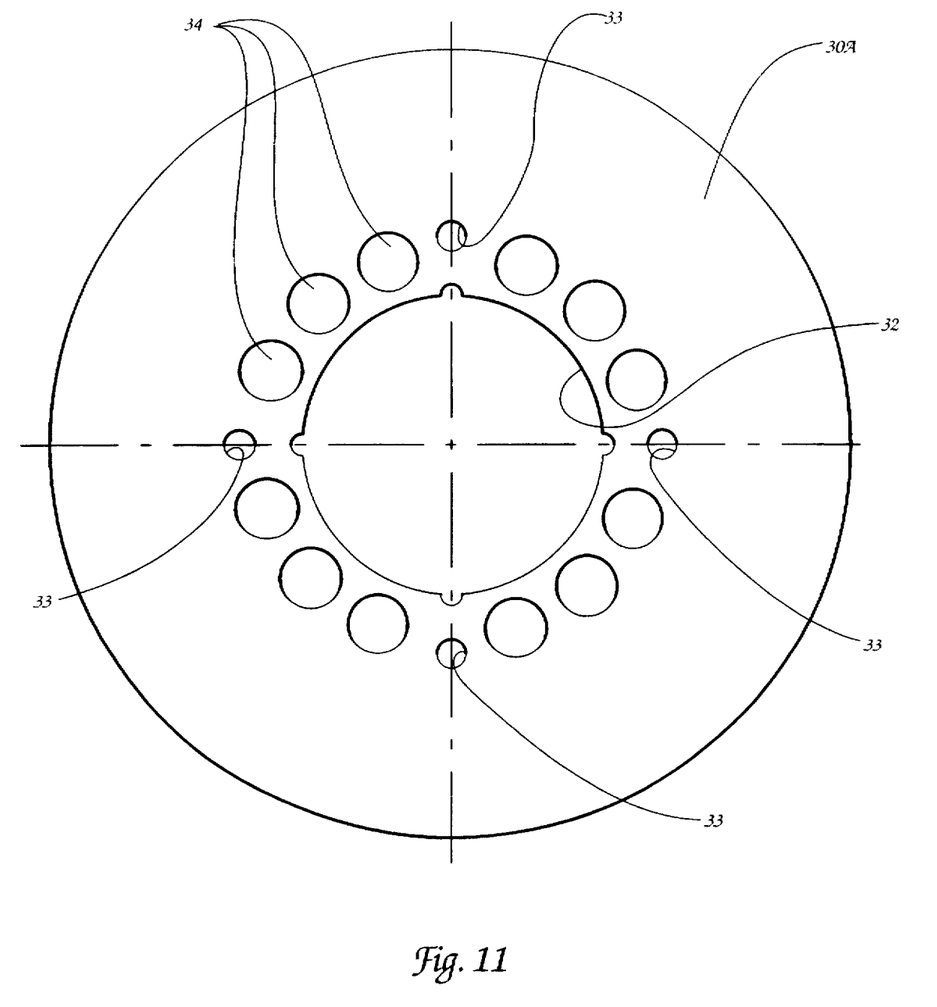
FIG. 11 is a plan view of a lamination according to the present invention.

As is best shown in FIG. 11, each lamination 30A has a central void 32 for receiving the rotor core 22 and mounting holes 33 for attachment of the laminations 30A to the rotor laminations 35. Vent slots 34 match up with the vent slots in the rotor core 22. As illustrated in FIG. 12, the rotor 20 according to the invention has a magnet zone "y" and a lamination zone "z" which collectively equal the length of the stator "x".

By way of example, a permanent magnet motor 10 according to an embodiment of the invention has the following specifications:
Motor horsepower: 20
Length of stack of rotor laminations 35—6.36 inches
Length of lamination stack 30—0.91 inches
Air gap at lamination zone "z"—15/1000's inch
Diameter of lamination 30A—6.594–6.596 inches
Thickness of lamination 30A—0.018 inch (26 gauge)
Material of lamination 30A—M50 Tempcor Testing revealed that such a design increases inductance by approximately 30 percent.

The laminations 30A can be positioned at any point on the rotor core 22, and can be divided into two or more segments at spaced-apart points on the rotor core 22. The diameter of the laminations 30A can be less than, equal to or greater than the diameter of the rotor 20, including the magnets 28 and laminations 35. All of these variations are available to optimize inductance while maintaining the well-known and desirable characteristics of surface-mounted permanent magnet brushless DC motors.

A permanent magnet motor with enhanced inductance is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A permanent magnet motor with enhanced inductance, comprising:

(a) a motor frame having annular inner walls defining a void therein;

(b) a stator mounted on and extending around the periphery of the inner walls of said frame in the void in the motor frame, said stator including windings positioned thereon for developing current from power supplied to the motor, the innermost portion of said stator defining a radial inner portion of said void;

(c) a rotor mounted in the void radially inwardly of said stator for concentric rotation in said motor frame in closely spaced-apart relation to said stator and having an iron core for air gap flux interaction with said stator, said rotor having a magnet zone and a lamination zone extending axially along the length of said rotor:

(i) said magnet zone having therein permanent magnets positioned on the rotor and projecting therefrom for interaction with the windings on the stator to produce magnetic-field induced torque for rotating the rotor, and defining a magnet zone air gap between the magnets and stator;

(ii) said lamination zone having therein a plurality of stacked laminations positioned on said rotor for rotation therewith, said lamination zone being axially adjacent to said magnet zone and devoid of magnets, said laminations extending radially outwardly from the rotor shaft into closely spaced-apart radial alignment with radially adjacent windings and forming an area of decreased air gap relative to the magnet zone air gap and with increased inductance between the stator and the rotor.

2. A permanent magnet motor according to claim 1, wherein said lamination zone is positioned on one end of said rotor, and wherein said magnet zone is adjacent to one side only of said lamination zone.

3. A permanent magnet motor according to claim 1, wherein said lamination zone occupies at least 5 percent of the combined length of the magnet zone and the lamination zone.

4. A permanent magnet motor according to claim 1, wherein each lamination has a thickness no greater than one percent of its diameter.

5. A permanent magnet motor according to claim 1, wherein said magnets have an arc width of no less than 140 degrees.

6. A permanent magnet motor according to claim 5, wherein said magnets have an arc width of between 150 and 160 degrees.

7. A permanent magnet motor with enhanced inductance, comprising:

(a) a motor frame having annular inner walls defining a void therein;

(b) a stator mounted on and extending around the periphery of the inner walls of said frame in the void in the motor frame, said stator including windings positioned thereon along an axial length "x" for developing current from power supplied to the motor, the innermost portion of said stator defining a radial inner portion of said void;

(c) a rotor mounted in the void radially inwardly of said stator for concentric rotation in said motor frame in closely spaced-apart relation to said stator and having an iron core for air gap flux interaction with said stator, said rotor having a magnet zone and a lamination zone extending axially along the length of said rotor:

(i) said magnet zone of a length "y" having therein permanent magnets positioned on the rotor and projecting therefrom for interaction with the windings on the stator to produce magnetic-field induced torque for rotating the rotor, and defining a magnet zone air gap between the magnets and stator;

(ii) said lamination zone of a length "z" having therein a plurality of stacked laminations positioned on said rotor for rotation therewith, said lamination zone being axially adjacent to said magnet zone and devoid of magnets, said laminations extending radially outwardly from the rotor shaft into closely spaced-apart radial alignment with radially adjacent windings and forming an area of decreased air gap relative to the magnet zone air gap and increased inductance between the stator and the rotor; and (iii) wherein the lengths "y" and "z" substantially equal the length "x".

8. A permanent magnet motor according to claim 7, wherein said permanent magnets comprise ferrite magnets.

9. A permanent magnet motor according to claim 7, wherein said magnets comprise neodymium-iron-boron magnets.

10. A permanent magnet motor according to claim 7, wherein said motor is a brushless DC motor.

11. A permanent magnet motor according to claim 10, and including power means, comprising:

(a) a three-phase AC power input;

(b) rectifier means for converting the AC power input into DC power;

(c) DC power storage means for storing the rectified AC power as DC; and (d) electronic power output means for discharging DC from the capacitors to the windings of the stator according to a predetermined torque-maximizing schedule.

12. A permanent magnet motor according to claim 11, wherein said electronic power output means includes transistor means operatively connected to the capacitors for current flow from said capacitors through said transistors to the windings of the stator, and memory means for storing the predetermined torque-maximizing schedule and for controlling the switching of the transistors according to the predetermined torque-maximizing schedule.

13. A permanent magnet motor with enhanced inductance, comprising:

(a) a motor frame having annular inner walls defining a void therein;

(b) a stator mounted on and extending around the periphery of the inner walls of said frame in the void in the motor frame, said stator including windings positioned thereon for developing current from power supplied to the motor, the innermost portion of said stator defining a radial inner portion of said void;

(c) a rotor mounted in the void radially inwardly of said stator for concentric rotation in said motor frame in closely spaced-apart relation to said stator and having an iron core for air gap flux interaction with said stator, said rotor having a magnet zone and a lamination zone extending axially along the length of said rotor:

(i) said magnet zone having therein permanent magnets positioned on the rotor and projecting therefrom for interaction with the windings on the stator to produce magnetic-field induced torque for rotating the rotor, said magnets having an arc width of no less than 140 degrees, and said magnet zone defining a magnet zone air gap between the magnets and stator;

(ii) said lamination zone having therein a plurality of stacked laminations positioned on said rotor for rotation therewith, said lamination zone being axially adjacent to said magnet zone and devoid of magnets, said laminations extending radially outwardly from the rotor shaft into closely spaced-apart radial alignment with radially adjacent windings and forming an area of decreased air gap relative to the magnet zone air gap and increased inductance between the stator and the rotor; and (iii) wherein said lamination zone is positioned on one end of said rotor, and wherein said magnet zone is adjacent to one side only of said lamination zone and the lamination zone occupies at least 5 percent and no more than 15 percent of the combined length of the magnet zone and the lamination zone and each lamination has a thickness no greater than one percent of its diameter.

14. A permanent magnet motor with enhanced inductance, comprising:

(a) a motor frame;

(b) a stator having stator windings thereon mounted in the frame;

(c) a rotor mounted in a void in the stator for concentric rotation in said motor frame in closely spaced-apart relation to said stator and having an iron core for air gap flux interaction with said stator, said rotor having a:

(i) first zone having a first stack of laminations extending therealong on which permanent magnets are surface-mounted, and which defines a first zone air gap between the magnets and stator; and (ii) a second zone axially adjacent to the first zone and having a second stack of laminations extending therealong and devoid of magnets, which second stack of laminations has a radius greater than the first stack of laminations and which extends radially outwardly into closely spaced apart relation with said stator windings and forming an area of decreased air gap relative to the first zone air gap and increased inductance between the stator and the rotor.

* * * * *